United States Patent [19]
Townsend

[11] 3,712,637
[45] Jan. 23, 1973

[54] CYCLE STAND

[75] Inventor: Almon F. Townsend, Worcester, Mass.

[73] Assignee: Persons-Majestic Mfg. Company, Worcester, Mass.

[22] Filed: July 21, 1971

[21] Appl. No.: 164,715

[52] U.S. Cl. ............................................. 280/293
[51] Int. Cl. ............................................. B62h 3/10
[58] Field of Search ........................... 280/293–303; 248/226 R

[56] References Cited

UNITED STATES PATENTS 535,160   3/1895   Campbell ........................... 280/293
969,920   9/1910   Taylor ................................. 280/303

FOREIGN PATENTS OR APPLICATIONS 1,064,321   5/1954   France ............................. 280/293

Primary Examiner—Kenneth H. Betts
Attorney—Charles R. Fay

[57] ABSTRACT

A separate stand for a bicycle comprising an elongated member, having a transverse hook at one end thereof, a bent out leg, at the opposite end, and a crank housing offset intermediate the ends of the member, and a stiffening member secured to the elongated member adjacent the hook and also adjacent the bend of the leg, said stiffening member also including a like crank housing supporting offset, and an appositely bent leg.

1 Claim, 3 Drawing Figures

PATENTED JAN 23 1973

3,712,637

INVENTOR
ALMON F. TOWNSEND

BY *Charles P. Fay,*
ATTORNEY

CYCLE STAND

BACKGROUND OF THE INVENTION

There have been U-shaped bicycle stands separate from the bicycle, but these are awkward to apply to the bicycle frame because one of the legs of the U must be inserted from one side of the frame member to the other side, and in some cases, particularly with so-called girl's bicycles, this is an awkward procedure.

The prior art U-shaped bicycle stand, regardless of how heavy they may be made and regardless of extraneous devices for securing the legs together, nevertheless tend to spread under the weight of the bicycle; and in fact if pressure is placed on the bicycle to tend to move it in a forward direction, the legs forming the U-shaped member will tend to "walk" in a forward direction, so that not only is the U-shaped stand difficult or at least inconvenient to apply to the bicycle frame, but it also does not support it very efficiently.

It is the purpose of the present invention to provide a bicycle stand for display of the bicycle without interference with the derailleur apparatus, and which is also convenient for domestic use, which can be easily applied from one side only of the bicycle frame, and in which the legs for the stand do not tend to spread.

SUMMARY OF THE INVENTION

A bicycle stand that is separate from the bicycle comprising an elongated member having a hook at one end, the hook being adapted to be applied to the frame of the bicycle just in advance of the crank housing, said member having a jog or offset intermediate the ends thereof for insertion under the crank housing supporting the same and the entire rear portion of the bicycle. The elongated member then extends downwardly to the ground terminating in a bent out leg. The member has a stiffening element in the form of a rod or the like having an upper end thereof secured to the elongated member adjacent the hook and extending outwardly (laterally) in spaced relation, and also having a crank housing supporting jog or offset complementary to the offset in the elongated member. The stiffening rod is then curved to conjoin with the elongated member adjacent its leg and having an oppositely bent leg of its own so that the bicycle is supported by two separated legs. When the hook is properly applied to the frame and the two offsets properly applied to support the crank housing, said legs will be positioned with their feet, one at either side of the bicycle.

PREFERRED EMBODIMENT OF THE INVENTION

Figure 1:
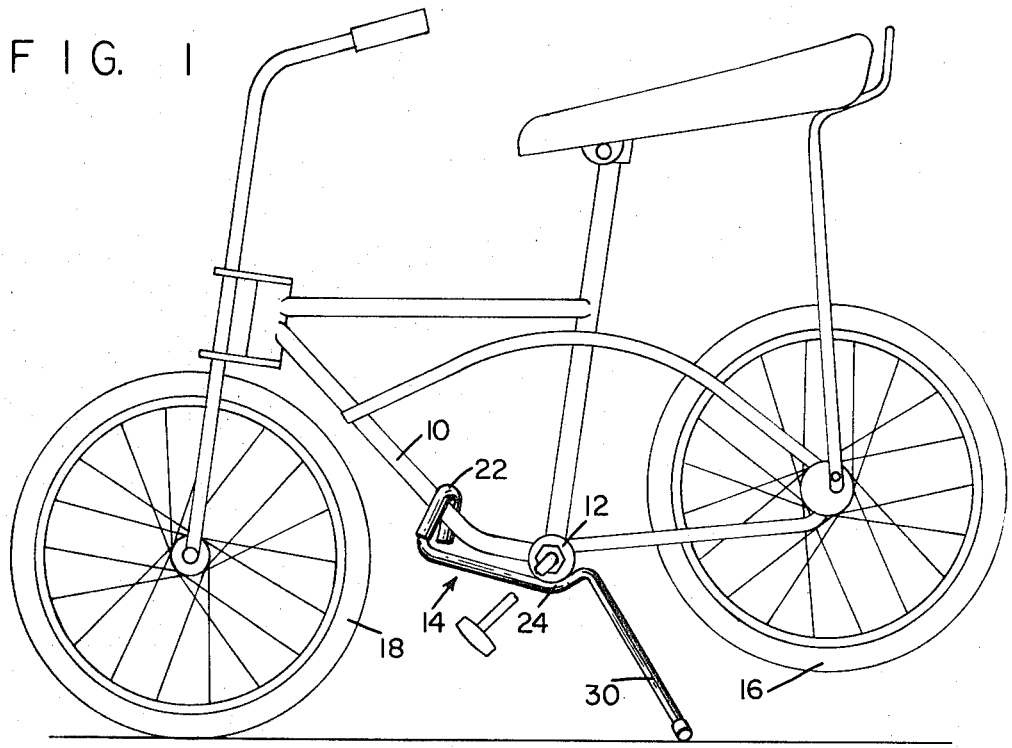
FIG. 1 is a view in elevation illustrating the novel bicycle stand in operation.

As shown in FIG. 1, the stand is applied to any conventional bicycle having any usual frame member 10 extending forwardly and upwardly from the crank housing 12 to the fork head. The stand forming the present invention is generally indicated by the reference numeral 14, and maintains the rear wheel 16 above ground level while the front wheel 18 is on the ground.

Figure 3:
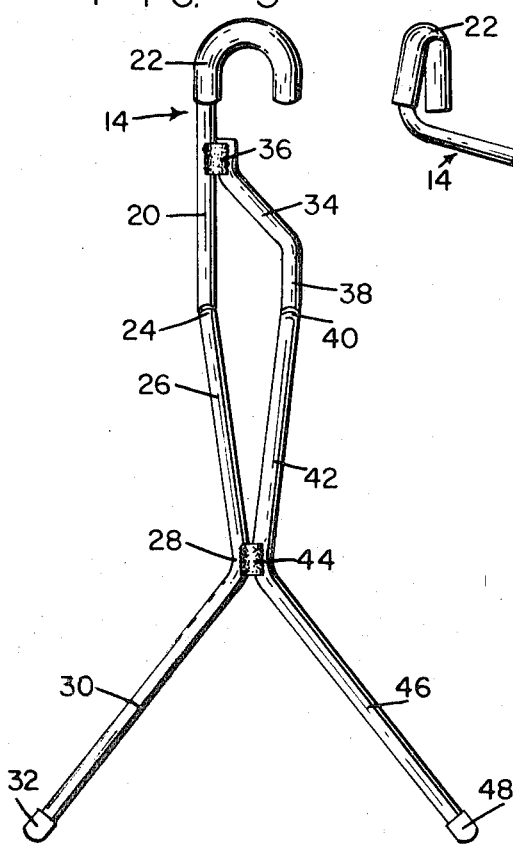
FIG. 3 is a plan view looking in the direction of arrow 3 in FIG. 2.
Figure 2:
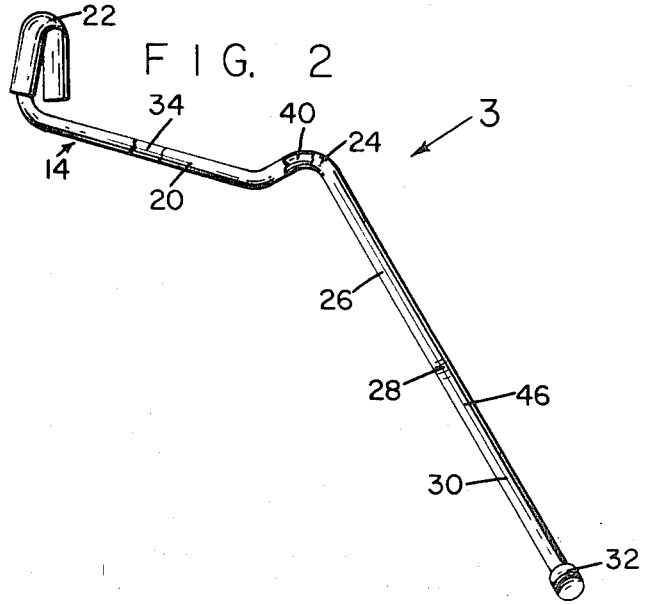
FIG. 2 is a view on an enlarged scale showing the stand in side elevation.

The bicycle stand comprises an elongated rod member generally indicated at 20, see FIGS. 2 and 3. This elongated rod has a transversely bent hook portion 22, which is preferably encased in a simple tubular plastic member to prevent scratching frame member 10. This hook is clearly shown in FIG. 3 as extending laterally of the general length of the rod 20.

The rod 20 is provided with an offset or jog at 24 intermediate the end thereof. This offset extends upwardly in more or less the same direction as the hook except that it is a longitudinally arranged offset as respects rod 20 and is not transverse with respect thereto as is the hook. From the offset 24 the rod member 20 extends downwardly as at 26 in FIG. 2 and at 28 is bent outwardly oppositely from the hook to form leg 30 having a foot 32.

The rod 20 is provided with a stiffening element 34. This is attached at one end as by welding or any other convenient means at 36 to the rod member 20 adjacent the base of the hook 22. From this connection 36 the stiffening element extends outwardly away from rod member 20 in the direction of the hook as shown at 38 and is provided with a jog or offset 40 which is the same as the offset 24 spaced therefrom a considerable distance, i.e., enough to solidly contact and support the crank housing 12, to support the bicycle.

From the offset at 40 the rod 34 extends inwardly toward rod 20 as in the area at 42 being connected thereto at 44 by any means such as welding, bolts, etc., and thereafter at 46 it extends out oppositely to leg 30 forming its own leg which has a foot 48.

In the use of the device it is merely necessary to place the hook 22 over frame member 10, lift the rear wheel slightly so as to allow the offsets at 24 and 40 to lie under the crank housing 12. The hook 22 may of course be applied to frame member 10 at any point longitudinally thereof so that the offsets 24, 40 will underlie and support the crank housing, and so that the rear wheel is supported off the ground.

I claim:

1. The combination of a bicycle having a frame, wheels, and a crank housing, with a stand comprising an elongated member having a pair of generally straight portions at an angle to each other, each portion having a free end, a hook at the free end of one of said portions, an offset intermediate the ends of said portions, the other of said portions having another bend transversely with respect thereto adjacent the offset, and an elongated stiffening member comprising a pair of portions arranged at an angle to each other, an offset between said stiffening member portions, the offsets being aligned, each of said portions having a free end, the free end of one of said portions being secured to one of the portions of the first member having the hook, the point of securement of the members being adjacent to but short of the hook, said members diverging from the point of securement to the offsets and then converging to a point of contact, the members being secured at the point of contact, the members thereafter diverging and forming supporting legs for the stand, said offsets being spaced and providing a support for the crank housing of the bicycle while the hook is engaged over a frame portion of the bicycle adjacent the crank housing.

* * * * *